US006899493B1

United States Patent
Russell

(10) Patent No.: US 6,899,493 B1
(45) Date of Patent: May 31, 2005

(54) CUTTING TOOL

(76) Inventor: Jeffrey D. Russell, 345 Lysander, Rochester, MI (US) 48307

( * ) Notice: Subject to any disclaimer, the term of this patent is extended or adjusted under 35 U.S.C. 154(b) by 0 days.

(21) Appl. No.: 09/720,021
(22) PCT Filed: Apr. 19, 2000
(86) PCT No.: PCT/US00/10680
§ 371 (c)(1),
(2), (4) Date: Dec. 19, 2000
(87) PCT Pub. No.: WO00/62982
PCT Pub. Date: Oct. 26, 2000

Related U.S. Application Data
(60) Provisional application No. 60/130,054, filed on Apr. 19, 1999.

(51) Int. Cl.[7] .............................. B26D 1/14; B23C 5/00
(52) U.S. Cl. ......................... 407/35; 407/43; 407/29.13
(58) Field of Search .............................. 407/35, 40, 41, 407/43, 46, 47, 51, 56, 29, 29.12, 29.13, 30

(56) References Cited

U.S. PATENT DOCUMENTS

| | | | | |
|---|---|---|---|---|
| 2,079,995 A | * | 5/1937 | Hodgkins | 407/29.13 |
| 2,085,202 A | * | 6/1937 | Sauer | 407/29.13 |
| 4,023,246 A | * | 5/1977 | Haug et al. | 407/56 |
| 4,522,538 A | * | 6/1985 | Lindsay | 407/35 |
| 5,605,420 A | * | 2/1997 | Feldsine | 407/32 |
| 5,890,846 A | * | 4/1999 | Clark et al. | 407/21 |
| 5,924,826 A | * | 7/1999 | Bystrom et al. | 407/103 |
| 6,244,790 B1 | * | 6/2001 | Kingdom et al. | 407/110 |
| 6,261,032 B1 | * | 7/2001 | Duwe et al. | 407/110 |

* cited by examiner

Primary Examiner—Henry W. H. Tsai
(74) Attorney, Agent, or Firm—Warn Hoffmann Miller & LaLone PC

(57) ABSTRACT

A rotary cutting tool (10) having a plurality of removable cutting inserts (16) is provided. The rotary cutting tool (10) comprises a rotary tool body (12) for rotation about a central shaft. The tool body includes an outer profile peripheral surface (18). A plurality of slots (24) extend radially inwardly from the outer peripheral edge of the tool body. A plurality of cutting inserts (16) are placed in the slots (24).

15 Claims, 4 Drawing Sheets

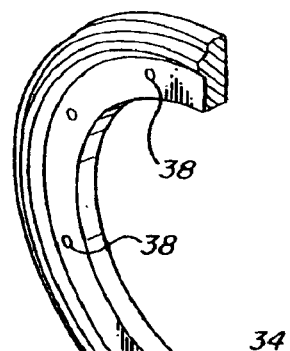
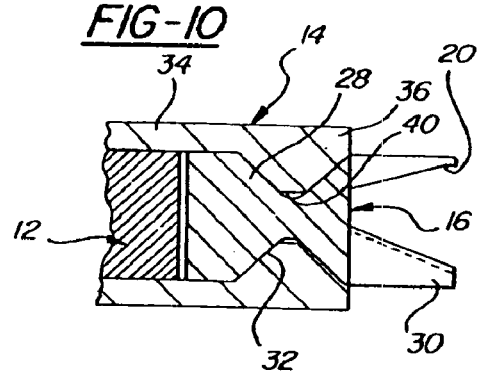
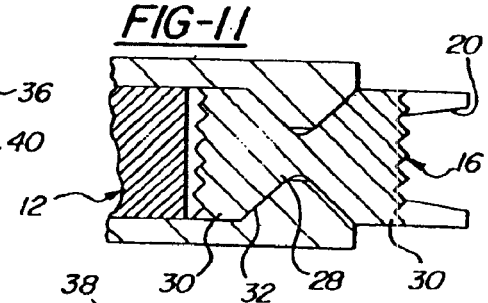
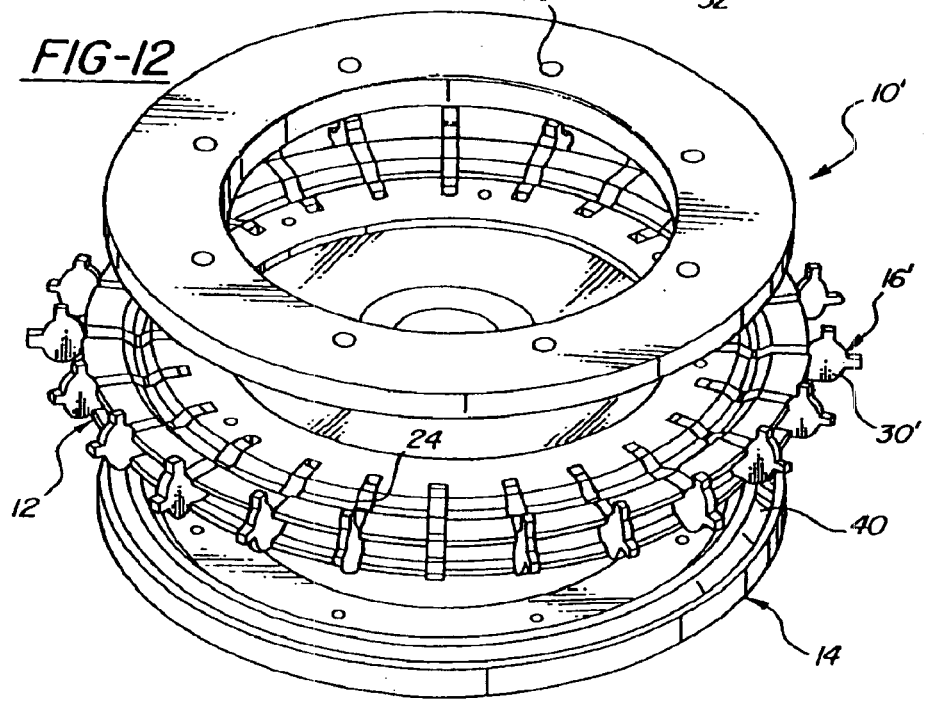

CUTTING TOOL

This application is a 371 of PCT/US00/10680 filed Apr. 19, 2000 which claims benefit of Provisional Ser. No. 60/130,054 filed Apr. 19, 1999.

TECHNICAL FIELD

The present invention relates to rotary cutting tools and, more specifically, to rotary cutting tools with inserted cutters placed about the axis of rotation.

BACKGROUND OF THE INVENTION

Rotary cutting tools are used in a wide range of manufacturing applications to machine a wide variety of materials.

One of the existing problems with rotary cutting tools with inserted cutters has been the ability to maximize the number of inserted cutters in the periphery or face of the rotary cutting tools. The prior art has used a variety of mechanical locking mechanisms to attach the inserted cutter to the rotary cutting tool body. These mechanical attachment mechanisms are often located in the plane of the rotation of the inserted cutter. The inserted cutter attachment mechanism thus reduces the amount of cutter body available for inserted cutters limiting the number of inserted cutters that may be attached. One such mechanism is shown in U.S. Pat. No. 4,275,853 to Kruez, et al. Another is shown in U.S. Pat. No. 5,725,416 to Russell.

Another problem with rotary cutting tools with inserted cutters is associated with the brazing of inserted cutters to the face or periphery of the cutting tool body. When inserted cutters are brazed to the cutting tool body, the precise geometry of the cutting surface must be machined after brazing attachment, increasing cost of manufacture. Also resharpening or replacing brazed inserted cutters in the periphery or face of the rotary cutting tool increases the costs of manufacture of the cutting tool. Additionally, complex shapes and geometries are difficult or impossible to machine in the brazed inserted cutter after attachment to the cutter body.

SUMMARY OF THE INVENTION

According to the present invention, there is provided a cutting tool comprising a tool body having at least one slot therein. The cutting tool further includes a cutting tool insert disposed in the slot. The cutting tool insert has a body portion defining at least one side edge. The cutting tool insert further includes a cutting portion. The cutting tool further includes at least one attachment ring fixed relative to the tool body. The attachment ring applies a holding force to the side edge of the body portion of the cutting insert to retain the cutting insert in the slot.

One feature of the present invention provides a rotary cutting tool with inserted cutters placed about the axis of rotation. These inserted cutters may be placed on the periphery, face, or a combination of surfaces about the rotational axis of the cutting tool body.

Another feature of the present invention provides a rotary cutting tool with inserted cutters held in position by a mechanism that lies about the rotational axis of the tool. The attachment mechanisms position the inserted cutters precisely about the rotary tool body through use of related or complimentary geometry formed in the inserted cutter and attachment mechanisms. The related geometries hold the insert in location without reducing the available circumference of the cutting tool body thus increasing the amount of inserted cutters that can be attached to a given circumference.

Another feature of the present invention provides the attachment mechanisms, inserted cutters and their related geometries may be used to position and attach the inserted cutters to the rotary cutting tool body. The related geometries of the attachment mechanisms and the inserted cutters are manufactured identical to each other to provide a precise fit and secure attachment to the rotary cutting tool body.

Another feature of the present invention provides the attachment mechanisms, inserted cutters and their related geometries may be used to position and attach the inserted cutters to the rotary cutting tool body. The related geometries of the attachment mechanism and the inserted cutters are manufactured to create interference between the attachment mechanism and the inserted cutters to provide a precise fit and secure attachment to the rotary cutting tool body.

Another feature of the present invention provides the attachment mechanisms, inserted cutters and their related geometries may be used to position the inserted cutters as a temporary fixture to braze the inserted cutters precisely in position relative to the cutter body. The use of the attachment mechanism, inserted cutters and their related geometries allows the attachment of the inserted cutters precisely without the need of machining geometries of the cutting surface after brazing attachment, reducing the cost of manufacture.

BRIEF DESCRIPTION OF THE DRAWINGS

Other advantages of the present invention will be readily appreciated as the same becomes better understood by reference to the detailed description when considered in connection with the accompanying drawings wherein:

FIG. 9 is a perspective view of an attachment ring (partially broken away);

FIG. 10 is a cross-sectional view taken along lines 10—10 of FIG. 1;

FIG. 11 is a cross-sectional view similar to FIG. 10, but showing an alternate tool insert and tool body profile;

FIG. 12 is an exploded view of an alternative embodiment of the present invention.

DETAILED DESCRIPTION OF THE DRAWINGS

A cutting tool according to the present invention is generally shown at 10 in the figures. The cutting tool 10 includes a base plate or cutting tool body generally indicated at 12 and at least one attachment ring generally indicated at 14. The tool 10 also includes a plurality of cutting inserts generally indicated at 16.

Figure 1:
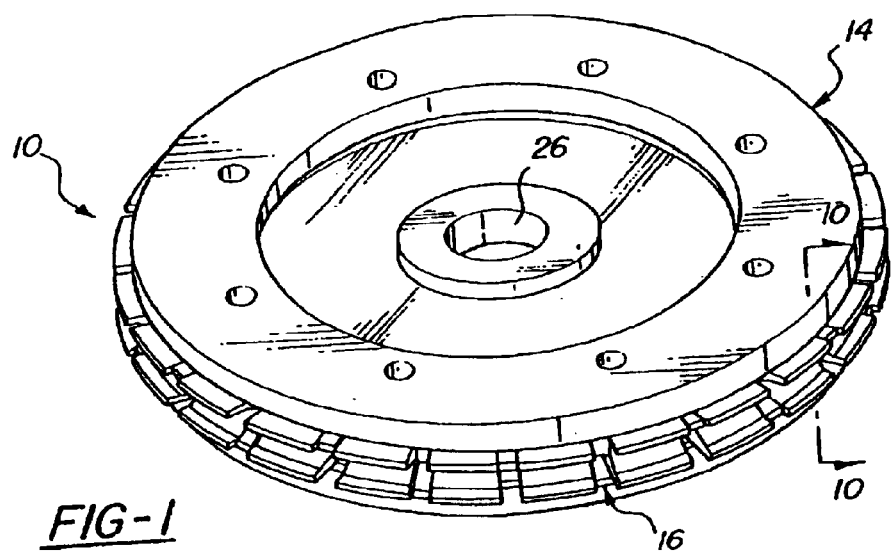
FIG. 1 is a perspective view of an assembled cutting tool made in accordance with the preferred embodiment of the present invention.
Figure 2:
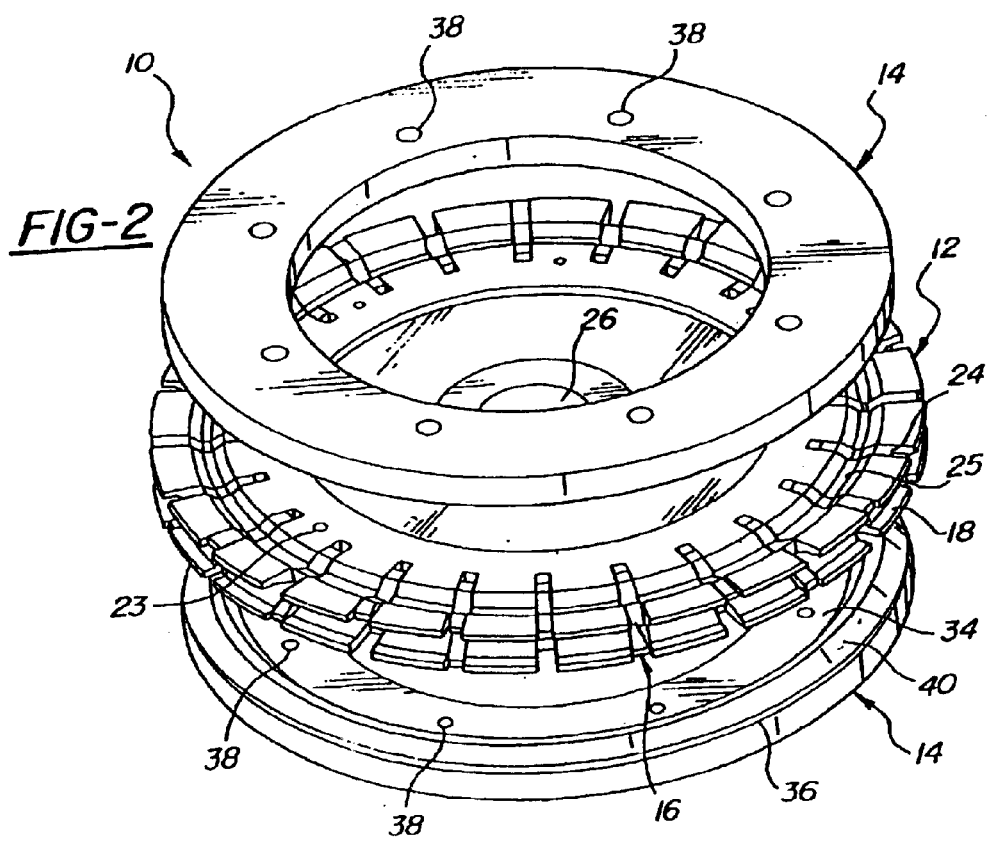
FIG. 2 is an exploded view of a cutting tool made in accordance with the preferred embodiment of the present invention.
Figure 3:
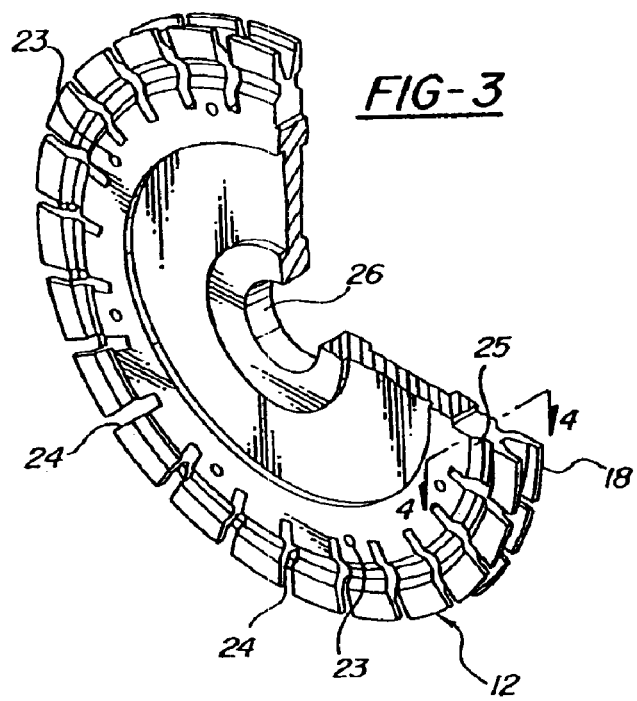
FIG. 3 is a perspective view of the base plate (partially broken away)
Figure 4:
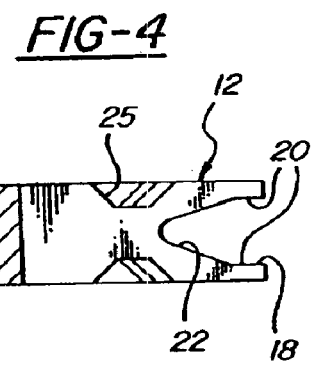
FIG. 4 is a cross-sectional view taken along lines 4—4.

As best shown in FIGS. 2–4, the base plate or rotary cutting tool body 12 is generally cylindrical and includes an external profile 18. The external profile 18 can take any configuration, depending upon the final shape and material needed to be cut. As shown, the external profile 18 includes a pair of upstanding walls 20 at the peripheral edges of the base plate 12 and having a generally "V" shape configuration shown at 22 inwardly of the walls 20. The base plate 12 also includes a plurality of slots 24 disposed in the radial direction for receiving the cutting inserts 16. The base plate 12 shown is for making a specific shaped part. It will be appreciated, however, that the profile can take any configuration depending on the desired shape of the final product needed to be made.

The base plate 12 also includes an opening 26 in the center thereof for attaching the cutting tool 10 with a machine. The opening 26 defines the axis of rotation of the cutting tool 10. A plurality of smaller openings 23 are disposed about the base plate 12 inward of the peripheral edge for allowing the attachment rings 14 to be secured to the base plate 12, as will be described subsequently. The base plate 12 also includes an annular indentation 25 for receiving a portion of the annual attachment ring 14 as will be described subsequently. In the preferred embodiment, each side of the base plate 12 includes an annular indentation 25. The annular indentation 25 can take any configuration, but should not interfere with the connection of the attachment ring 14 and cutting insert 16.

As be shown in FIGS. 2–5, the slots 24 extend radially inwardly from the peripheral edge of the base plate 12. In the preferred embodiment, the slots 24 extend in a radial direction. However, it will be appreciated that the slots 24 may be angled slightly relative to the radial direction if desired. The slots 24 extend inwardly, preferably beyond the depth of the external profile 18 defined in the base plate 12.

A typical cutting insert 16 made in accordance with the present invention is best shown in FIGS. 5–8. The cutting insert 16 includes a body portion 28 and a cutting portion 30. The body portion 28 is adapted to fit into the slots 24 defined in the base plate 12. The body portion 28 defines a pair of side edges 31.

The cutting portion 30 extends upwardly from the end edge body portion 28 and is used to cut the material to be cut by the cutting tool 10. It will be appreciated that the cutting portion 30 may take any configuration within the context of the present invention, depending on the desired configuration to be cut into the material to be cut. As shown in FIGS. 5–8 and 10, the cutting portion 30 is configured to include a single cutter disposed to cut in the radial direction of the tool 12. The particular cutter shown is useful to cut a portion of a v-shaped part.

Figure 5:
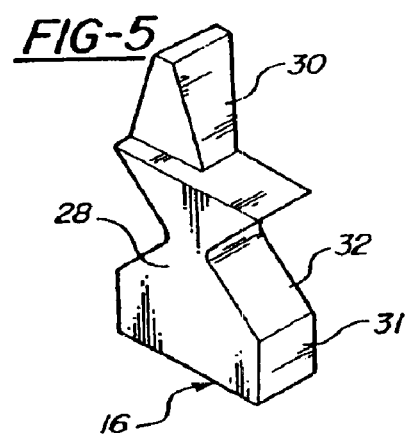
FIG. 5 is a perspective view of a cutting tool insert made in accordance with the present invention.
Figure 6:
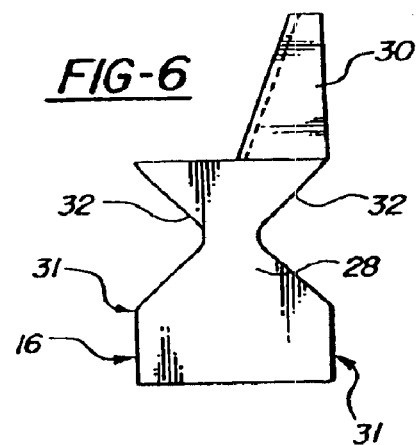
FIG. 6 is a front elevation view of a cutting tool insert.
Figure 7:
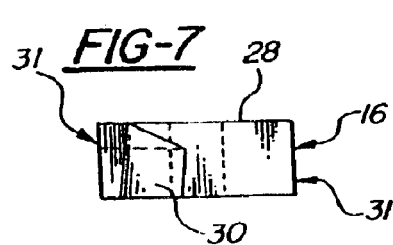
FIG. 7 is a top view of a cutting tool insert.
Figure 8:
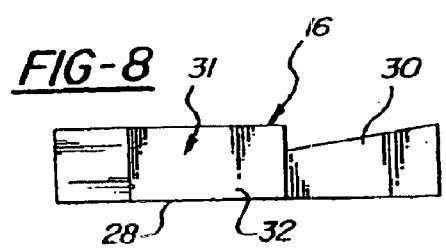
FIG. 8 is a side view of a cutting tool insert.

An important aspect of the present invention lies in the configuration of the body portion 28 of the cutting inserts 16. Specifically, as best shown in FIGS. 5 and 6, the cutting inserts 16 define a geometrical configuration 32 on the side edges 31 thereof. As shown, the geometrical configuration 32 is a pair of converging walls generally shown in a "v" shape. As will be described in detail below, this geometrical configuration 32 allows the cutting insert 16 to be held firmly and precisely within the base plate 12, when the attachment rings 14 are attached. Specifically, the attachment rings provide a holding force to the side edges 31 of the cutting insert 16 to retain the cutting inserts in the slots 24. The specific shape of the geometric configuration 32 may change, but it is important that the geometric configuration 32 be related or complimentary to the geometric configuration of the attachment ring 14.

Figure 13:
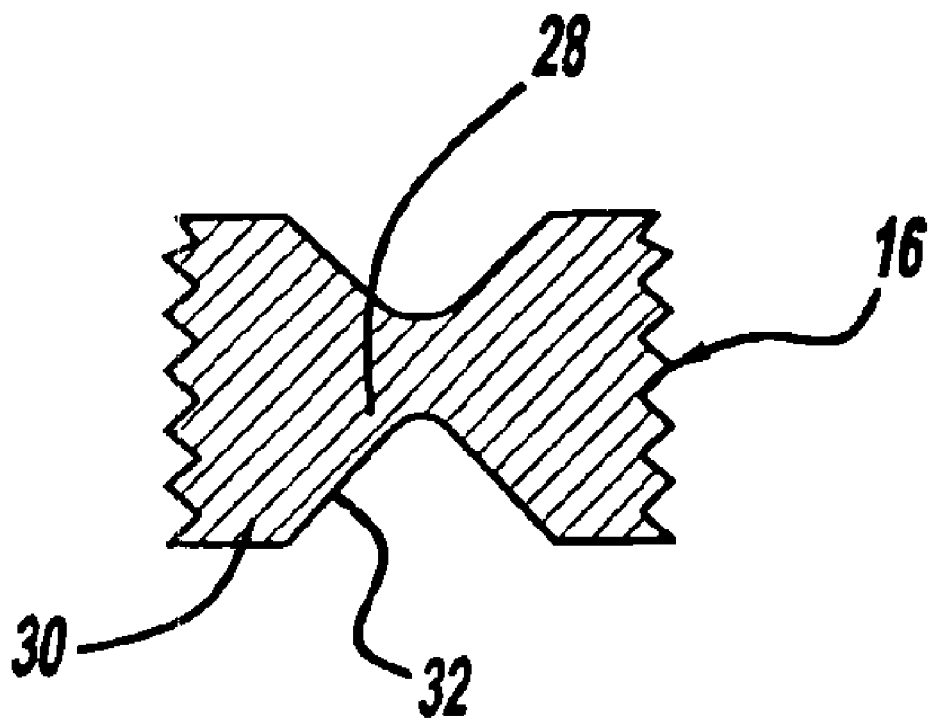
FIG. 13 is a plan view of the insert of FIG. 11.

As best shown in FIGS. 11 and 13, the cutting insert 16 may be doubled sided. That is, each end of the cutting insert body portion 28 may include a cutting portion 30. With this configuration, the geometrical configuration 32 is centrally located between the two cutting portions. The use of such a cutting insert 16 allows for the reversal of the insert 16 in the cutting tool 10, allowing the insert 16 to be used multiple times before the need to sharpen the insert 16. FIG. 11 indicates an alternate configuration for the cutter.

An attachment ring 14 is best seen in FIGS. 9 and 10. The attachment ring 14 is annular about the rotation axis of the cutting tool 10. The attachment ring 14 includes an inner area 34 and an outer area 36. The inner area 34 is generally flat and includes a plurality of openings 38 therethrough for receiving fasteners (not shown) to hold the cutting tool 10 together. The outer area 36 is generally flat on the outer surface, but has an annular rib defining a geometrical configuration 40 on the inner surface (as best seen in FIGS. 9–11).

The geometrical configuration 40 is adapted for engagement with the geometrical configuration 32 of the cutting insert 16 for precisely locating the cutting insert 16 within the cutting tool assembly 10. As shown, the geometric configuration 40 comprises generally, in cross section, a truncated triangular section (as best seen in FIG. 10). The truncated triangular section engages the geometrical configuration 32 defined in the cutting insert 16 to thereby interfere with or engage the cutting insert 16 and hold the cutting insert 16 within the assembled cutting tool 10. More specifically, each of the geometries 32 and 40 are precisely machined such that they provide an interference fit between the cutting tool 10 and outer area 36 of the attachment ring 14 to precisely locate the cutting insert 16 within the slot 24 in the base plate 12. Because of the precise nature of the fit, the cutting inserts 16 are precisely located in the base plate 12. This is important because each of the cutting portions 30 must be aligned in a specific orientation in order to cut a precise part by utilizing the cutting tool 10. It is important to locate the cutting portions 30 in the precise orientation relative to its base plate 12. This is because the cutting portions 30, at least some of its inserts 16, need to be precisely aligned to properly perform the cutting function. If there is misalignment among the cutters, a precise part cannot be manufactured.

The fit between the cutting insert 16 and attachment ring 14 can be described as an interference fit. This is because, as shown, the configurations 32,40 do not exactly mate. The geometry 40 on the attachment ring 14 is slightly arced over the width of any given cutting insert 16. Because the insert width is flat and not arcuate, the fit between the cutting insert 16 and attachment ring 14 is an interference fit. If desired, the geometries 32,40 can mate by making the insert geometry 32,40 slightly arcuate. Of course, such a modification is within the scope of the present invention. It has been found, however, that such an interferences fit works well to precisely locate and securely hold the cutting insert 16 in the tool body 10.

While utilizing this type of attachment arrangement, the cutting inserts 16 are held in position relative to the base plate 12 by an attachment mechanism that lies about the rotational axis of the cutting tool 10. It is the related or complimentary geometries formed in the cutting insert 16 and outer area 36 of the attachment ring 14 that precisely and securely hold cutting insert 16 within the cutting tool 10. This arrangement allows the amount of area available for the cutting insert 16 to be maximized that can be attached around any given circumference of a cutting tool 10. That is, because the holding force takes place from the side edges of the insert 16 and base plate 12 by the clamping force of the attachment rings 14, more inserts 16 can be fit around the circumference of the tool 10.

It is contemplated that within the scope of the present invention, the related geometries 32,40 of the attachment mechanism and the inserted cutters may be formed by any of a number of geometric shapes, including, but not limited to, are sections of circles, square or rectangular forms, other sections of regular or irregular polygons, triangles or sections of triangles, or rhombus. Any configuration capable of locating and holding the insert 16 relative to the attachment rings 14 is within the scope of the present invention.

The preferred arrangement of related geometries 32,40 for cutting insert 16 and attachment ring 14 is as shown and comprises a generally triangular or v-shaped slot machined in the cutting insert 16 and an attachment mechanism formed by a ring in the shape of a section of a truncated triangle in the attachment ring 14 and a cutter body 28 with a mating groove identical to the shape of the section of a triangle on the attachment ring 14. The interference pattern created between the triangular surface 32 of the inserted cutter and the attachment ring surface 40 securely and precisely attach the inserted cutter 16 to the rotary cutter body 12 when the parts are assembled.

As best seen in FIG. 2, the cutting tool 10 preferably includes a pair of attachment rings 14 disposed on opposing sides of the base plate 12. In this manner, the base plate 12 and cutting inserts 16 are trapped or sandwiched between the pair of adjacent rings 14 and secured therebetween by fasteners (not shown), through the holes 23 and 38. The fasteners can comprise any configuration, but preferably comprise a bolt and nut. Alternatively, at least one set of holes 38 may be threaded such that a fastener, such as a bolt passing through one of the attachment rings 14 and base plate 12 can be threaded secured to the hole 38 in the opposing attachment ring 14.

The use of this type of tool 10 allows for relatively easy sharpening of the cutting inserts 16 or –replacement thereof. More specifically, because the cutting tool 10 can easily be disassembled (by removing the fasteners) and reassembled, this facilitates the sharpening and/or replacement of the inserts 16. Because of the unique interaction of the geometries 32,40, reassembly of the tool insures that the cutting inserts 16 are located in the precise location.

The attachment rings 14 may alternatively be used to position the inserts 16 as a temporary fixture until the inserts 16 can be brazed or otherwise affixed to the base plate 12. Again, the use of the attachment rings 14 having the precise geometry allows the cutting inserts 16 and their related geometries to be held precisely within the base plate 12 without the need to machine the cutting portion 30 after the brazing or other attachment has taken place. After the brazing has been completed, the attachment ring 14 can simply be removed, if desired.

It is also contemplated that the rotary cutting tools may include abrasive sections attached to or integral to the rotary tool body to combine the function of cutting and abrading in one rotary cutting tool. Specifically, profile 18, and, specifically, the walls 20 and/or "v" shape 22 of the base plate 12 may be coated with an abrasive (as is well known in the art) thereon such that the tool 10 can perform both a cutting and grinding function simultaneously. Again, the configuration of the section to which the abrasive is applied can take any shape depending on the configuration of the final product.

FIG. 12 shows an alternative embodiment of the present invention where the cutting takes place in the direction of the axis of rotation of the cutting tool 10'. A second cutter is shown on the cutting portion 30' and is in the direction parallel to the axis of rotation. That is, the second cutter on the cutting portion 30' of the insert 16' extends from the cutting portion 30' in the direction of the axis of rotation of the tool 110. Otherwise, all features of the invention are the same. The cutting insert 16' is arranged so that the cutter on the cutting portion 30' cuts in the direction of the rotational axis of the tool 10.

It will be appreciated that the cutting portion 30 can extend both in the direction of the rotation of the cutting tool 10, or at any angle relative thereto. This can also be simultaneously or alternatively accomplished simply by modifying the cutting portion 30 of the insert 16.

To assemble a cutting tool 10 of the present invention, the base plate 12 first needs to be made. The base plate 12 includes the slots 24 as well as the annular indentation 25.

The cutting inserts 16 are made having a specific geometry 32 adapted to mate or engage with a corresponding geometry 40 on the attachment rings 14.

The attachment rings 0.14 are made having a rib with the specific geometry 40 adapted to interfere with the geometry 32 on the insert 16. One attachment ring 14 is laid flat on a surface. The base plate 12 is positioned over the attachment ring 14 such that the rib 40 is positioned in the indentation 25. The cutting inserts 16 are then placed in the slots 24 such that the side edges 31 defining the geometry 32 of the cutting insert 16 engage the rib or surfaces defined by the geometry 40 of the attachment ring 14. The top attachment ring 14 is then placed over the base plate 12 such that the side edges 31 defining the geometry 32 of the cutting insert 16 engage the rib or surfaces defined by the geometry 40 of the attachment ring 14. Further, the rib 40 engages the indentation 25 on the tool body 12. The two attachment rings 14 are secured to one another by the fasteners (not shown). Even tightening of the fasteners around the periphery ensures precise location of the cutting inserts 16 relative to the attachment rings 14 and base plate 12. If desired, the cutting inserts 16 can be brazed for a permanent connection with the base plate 12. The tool 10 can then be affixed to a machine and used to cut the desired material.

The invention has been described in an illustrative manner, and it is to be understood that the terminology which has been used is intended to be in the nature of description rather than of limitation.

Obviously, many modifications and variations of the present invention are possible in light of the above teaching. It is, therefore, to be understood that within the scope of the appended claims, the invention may be practiced otherwise than as specifically described.

What is claimed is:

1. A cutting tool comprising:
   a tool body having at least one slot therein;
   a cutting insert disposed in said slot and having a body portion defining at least one side edge having a first geometrical configuration and a cutting portion; and
   at least one attachment ring fixed relative to said tool body, said attachment ring having a rib defining a complimentary geometrical configuration for engagement with said first geometrical configuration of said cutting insert thereby creating an interference fit and applying a holding force to said first geometrical configuration of said cutting insert to precisely position said cutting insert in said slot.

2. A cutting tool as set forth in claim 1 wherein said cutting insert body portion defines a pair of side edges, each of said side edges having said first geometrical configuration thereon.

3. A cutting tool as set forth in claim 1 including a pair of attachment rings, each of said rings having said rib thereon, said tool body having said cutting insert in said slot disposed between said pair of attachment rings, such that said rib engages said first geometrical configuration on said side edges of said cutting insert body to thereby precisely position said cutting insert in said slot.

4. A cutting tool as set forth in claim 2 wherein said tool body is generally cylindrical and has an annular indentation on each side thereof for receiving said ribs of said attachment rings.

5. A cutting tool as set forth in claim 3 wherein said ribs on said attachment rings are annular.

6. A cutting tool as set forth in claim 4 wherein said tool body defines an outer peripheral edge including an external profile thereon extending radially inwardly to a predetermined depth.

7. A cutting tool as set forth in claim 6 further including a plurality of said slots spaced about said peripheral edge and extending radially inwardly from said outer peripheral edge a distance greater than said depth of the external profile.

8. A cutting tool as set forth in claim 7 wherein said rib has a cross sectional configuration that is generally a truncated triangle.

9. A cutting tool as set forth in claim 8 wherein said geometrical configuration on said first side edge of said cutting insert comprises a pair of converging walls defining a generally v-shape.

10. A cutting tool as set forth in claim 7 wherein said external profile includes an abrading material disposed thereon.

11. A cutting tool as set forth in claim 9 wherein said cutting insert includes a pair of cutting portions disposed on opposite ends of said body portion, said geometrical configuration disposed between said cutting portions.

12. A method of assembly of a cutting tool comprising:
providing a rotary cutting tool body defining at least one side and an outer peripheral edge and having at least one slot extending inwardly from the peripheral edge;
inserting a cutting insert having a body portion defining at least one side edge with a first geometrical configuration and a cuffing portion in said slot; and
fixing an attachment ring having a rib to said tool body so as to engage the rib with said first geometrical configuration of the cutting insert in an interference fit thereby applying a holding force to said first geometrical configuration of said cutting insert to precisely position the said cutting insert in said slot from the side edge thereof.

13. A method as set forth in claim 12 wherein said rib engages said first geometric configuration of said cutting tool insert to precisely position said cutting tool insert in the slot.

14. A method as set forth in claim 13 further comprising the steps of providing a pair of attachment rings and fixing said attachment rings to one another, and having said tool body and said cutting inserts therebetween.

15. A method as set forth in claim 14 further comprising the step of brazing said cutting inserts to the tool body to secure said cutting inserts in said slot.

* * * * *